US009792301B2

(12) United States Patent
Rodriguez-Serrano et al.

(10) Patent No.: US 9,792,301 B2
(45) Date of Patent: Oct. 17, 2017

(54) MULTI-QUERY PRIVACY-PRESERVING PARKING MANAGEMENT SYSTEM AND METHOD

(71) Applicant: Xerox Corporation, Norwalk, CT (US)

(72) Inventors: Jose Antonio Rodriguez-Serrano, Grenoble (FR); Florent Perronnin, Domene (FR)

(73) Assignee: Conduent Business Services, LLC, Dallas, TX (US)

(*) Notice: Subject to any disclaimer, the term of this patent is extended or adjusted under 35 U.S.C. 154(b) by 279 days.

(21) Appl. No.: 14/497,417

(22) Filed: Sep. 26, 2014

(65) Prior Publication Data
US 2016/0092473 A1 Mar. 31, 2016

(51) Int. Cl.
G06F 17/30 (2006.01)
G07F 17/24 (2006.01)
G06Q 20/14 (2012.01)

(52) U.S. Cl.
CPC ..... *G06F 17/30253* (2013.01); *G06Q 20/145* (2013.01); *G07F 17/24* (2013.01)

(58) Field of Classification Search
None
See application file for complete search history.

(56) References Cited

U.S. PATENT DOCUMENTS 5,852,823 A * 12/1998 De Bonet ........... G06F 17/3025
382/162
8,218,822 B2 7/2012 Sefton
8,374,910 B1 2/2013 Spasokukotskiy
8,447,112 B2 5/2013 Paul et al.
8,533,204 B2 9/2013 Serrano et al.
8,548,845 B2 10/2013 Hedley et al.
8,588,470 B2 11/2013 Rodriguez Serrano et al.
(Continued)

FOREIGN PATENT DOCUMENTS

EP 2 565 804 A1 3/2013
WO WO 2011/099923 A1 8/2011
WO WO 2014/072971 A1 5/2014

OTHER PUBLICATIONS

U.S. Appl. No. 14/054,998, filed Oct. 16, 2013, Rodriguez Serrano et al.
(Continued)

*Primary Examiner* — James Trujillo
*Assistant Examiner* — Aida Tessema
(74) *Attorney, Agent, or Firm* — Kermit D. Lopez; Luis M. Ortiz; Ortiz & Lopez, PLLC

(57) ABSTRACT

A privacy-preserving multi-query parking management system and method. An image of a vehicle with respect to a specific part (e.g., license plate) can be captured when the vehicle enters via an entry point. An image signature can be computed by embedding the image into a descriptor space and the image signature can be stored in a database together with relevant metadata. An image of a vehicle with respect to the specific part can be captured when the vehicle exits via at least one exit point and an image signature can be computed. An entry-exit association with respect to the vehicle can be performed by searching for a most similar image signature in the database. Additionally, given a textual query (e.g., a license plate number), a signature can be computed by embedding the text into the same descriptor space.

17 Claims, 7 Drawing Sheets

(56) References Cited

U.S. PATENT DOCUMENTS

| | | | |
|---|---|---|---|
| 8,629,755 B2 | 1/2014 | Hashim-Waris | |
| 8,792,677 B2 | 7/2014 | Kephart | |
| 8,798,325 B2 | 8/2014 | Wu et al. | |
| 2003/0144890 A1 | 7/2003 | Dan | |
| 2005/0084134 A1* | 4/2005 | Toda | G08G 1/017 382/105 |
| 2007/0083424 A1* | 4/2007 | Lang | G06Q 10/02 705/13 |
| 2007/0122007 A1* | 5/2007 | Austin | G06K 9/00221 382/118 |
| 2009/0202105 A1 | 8/2009 | Castro Abrantes et al. | |
| 2009/0208059 A1* | 8/2009 | Geva | G06K 9/3258 382/105 |
| 2012/0045134 A1* | 2/2012 | Perronnin | G06K 9/6234 382/197 |
| 2012/0143853 A1* | 6/2012 | Gordo | G06F 17/3025 707/723 |
| 2012/0148105 A1 | 6/2012 | Burry et al. | |
| 2012/0263352 A1 | 10/2012 | Fan et al. | |
| 2012/0274482 A1* | 11/2012 | Chen | G08G 1/144 340/932.2 |
| 2014/0201064 A1 | 7/2014 | Jackson et al. | |
| 2014/0214500 A1* | 7/2014 | Hudson | G06Q 30/0284 705/13 |
| 2014/0334684 A1* | 11/2014 | Strimling | G06K 9/00771 382/105 |
| 2014/0355835 A1* | 12/2014 | Rodriguez-Serrano | G06K 9/72 382/105 |

OTHER PUBLICATIONS

Lowe, D. G., "Distinctive Image Features from Scale-Invariant Keypoints," International Journal of Computer Vision (2004) 60(2):91-110.

Perronnin, F. et al., "Improving the Fisher Kernel for Large-Scale Image Classification," Computer Vision—ECCV 2010, 11$^{th}$ European Conference on Computer Vision, Heraklion, Crete, Greece, Sep. 5-11, 2010, Proceedings, Part IV, pp. 143-156.

Rodriguez-Serrano, J. A. et al., "Data-driven vehicle identification by image matching," Computer Vision—ECCV 2012 Workshops and Demonstrations, Florence, Italy, Oct. 7-13, 2012, Proceedings, Part II, pp. 536-545.

Rodriguez-Serrano, J. A. et al., "Label embedding for text recognition," Proceedings British Machine Vision Conference 2013, BMVA Press, 12 pages.

* cited by examiner

MULTI-QUERY PRIVACY-PRESERVING PARKING MANAGEMENT SYSTEM AND METHOD

FIELD OF THE INVENTION

Embodiments are generally related to the field of parking management including systems, methods, and applications thereof. Embodiments are also related to image processing techniques. Embodiments are additionally related to image matching for use in re-identifying vehicles.

BACKGROUND

Parking management includes a variety of strategies that encourage more efficient use of existing parking facilities, improve the quality of service provided to parking facility users, and also improve parking facility design. Parking management thus addresses a wide range of transportation issues, while facilitating achievement of a variety of transportation, land use development, economic, and environmental objectives.

Conventionally, parking is managed by issuing a ticket at an entry to a parking lot and having the customer pay before exiting the lot. Payment is typically made via a parking lot ticketing machine. Additionally, ALPR (Automatic License Plate Recognition) of vehicles can be performed at the entry and the exit to a parking lot, which increases the reliability and value of the workflow above and beyond simply managing tickets and payments.

A problem associated with ALPR parking management systems, however, is that they are chiefly based on the use of OCR (Optical Character Recognition) technologies, which does not produce perfect or even near-perfect license plate recognition results. Furthermore, maintaining a database of license plate numbers captured via ALPR technologies has raised privacy concerns.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved parking management technology.

It is another aspect of the disclosed embodiments to provide for the use of image and/or text signature matching capabilities to enable a privacy-preserving multi-query parking management system and method.

It is yet another aspect of the disclosed embodiments to provide for a system and method for managing entries and exists in parking lots or car parks, wherein vehicles are identified solely by image signatures (not license plate numbers) and which allows for image-to-image queries, text-to-image queries, and image-to-text queries.

It is still another aspect of the disclosed embodiments to provide for a system and method for searching for license plate numbers even if the license plate number is never recognized or stored in a database.

It is a further aspect of the disclosed embodiments to provide for a multi-query privacy-preserving parking management system and method that does not require the explicit recognition and storage of license plate numbers, thereby leading to privacy preservation.

The aforementioned aspects and other objectives and advantages can now be achieved as described herein. An image of a vehicle with respect to a specific part (e.g., license plate) can be captured when the vehicle enters via an entry point. An image signature can be computed using a feature extraction method, which can be interpreted as an embedding of the image into a descriptor space. The signature can be stored in a database in association with relevant metadata. An image of a vehicle with respect to the specific part can be captured when the vehicle exits via an exit point and an image signature computed. An entry-exit association with respect to the vehicle can be performed by searching for a most similar signature in the database. Associations can also be made between images and textual queries of the license plate. Given a textual query (i.e., a license plate number), a signature can be computed by embedding the text into the same descriptor space. The system manages entries and exits in a parking lot and identifies the vehicle solely by performing an image-to-image query, a text-to-image query, and an image-to-text query.

An image signature can be computed by extracting a set of local patches from the image and then aggregating the patches via a Fisher vector (FV) framework. This involves (i) computing a descriptor vector for each patch, (ii) extracting a set of statistics from each patch descriptor, and (iii) aggregating the computed statistics. The image signature (e.g., the FV) can be made more discriminative by applying a projection which can be obtained, for instance, by learning a low-rank Mahalanobis metric. A visual signature such as the Fisher vector can be seen as a hash key of the original image.

The text signature can be computed by synthesizing the license plate images for the corresponding license plate number and the image signature can be computed as described above. The embedding of the license plate number is consequently the image signature of the synthesized plate. Alternatively, a spatial pyramid of characters (SPOC) can be computed and a mapping between a space of the text signatures and a space of the image signatures can be learnt utilizing a similarity learning method, which outputs a projection matrix. In some embodiments, matching between the image signatures and/or between the image signature and the text signature can be performed by measuring the similarity and/or distance between vectorial representations.

A ticket can also be issued at the entry point and the kiosk can be public (anybody can issue queries) or private (only an operator can issue queries), depending on design consideration. The user can input a license plate number to retrieve relevant information and the license plate number can be embedded into the similar descriptor space. The license plate number-license plate image association can be performed by searching for the most similar signature in the database. The system can be employed to identify a lost ticket, check the vehicle presence, search the vehicle, and manage a subscriber and black list.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
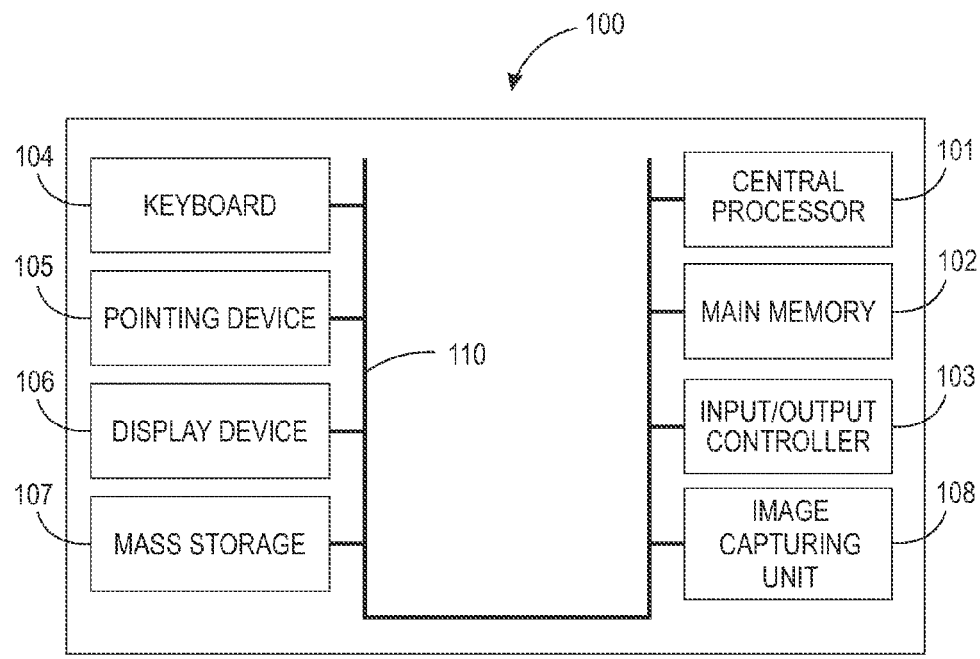
FIG. 1 illustrates a schematic view of a computer system in which an embodiment may be implemented.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the present invention can be embodied as a method, data processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB Rash Drives, DVDs, CD-ROMs, optical storage devices, magnetic storage devices, etc.

Computer program code for vehiclerying out operations of the present invention may be written in an object oriented programming language (e.g., Java, C++, etc.). The computer program code, however, for vehiclerying out operations of the present invention may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 2:
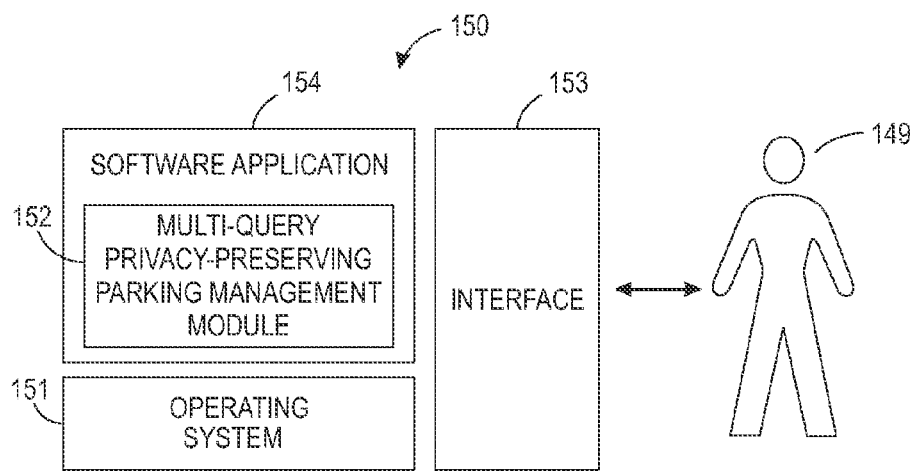
FIG. 2 illustrates a schematic view of a software system including a multi-query privacy-preserving parking management module, an operating system, and a user interface, in accordance with an embodiment.

FIGS. 1-2 are provided as exemplary diagrams of data-processing environments in which embodiments of the present invention may be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 1, the disclosed embodiments may be implemented in the context of a data-processing system 100 that includes, for example, a central processor 101, a main memory 102, an input/output controller 103, a keyboard 104, an input device 105 (e.g., a pointing device, such as a mouse, track ball, and pen device, etc.), a display device 106, a mass storage 107 (e.g., a hard disk), an image capturing unit 108 and a USB (Universal Serial Bus) peripheral connection. As illustrated, the various components of the data-processing system 100 can communicate electronically through a system bus 110 or similar architecture. The system bus 110 may be, for example, a subsystem that transfers data between, for example, computer components within data-processing system 100 or to and from other data-processing devices, components, computers, etc.

FIG. 2 illustrates a computer software system 150 for directing the operations of the data-processing system 100 depicted in FIG. 1. Software application 154, stored in main memory 102 and on mass storage 107, generally includes a kernel or operating system 151 and a shell or interface 153. One or more application programs, such as software application 154, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating system module 152 and/or software application 154.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

The interface 153, which is preferably a graphical user interface (GUI), also serves to display results, whereupon the user may supply additional inputs or terminate the session. In an embodiment, operating system 151 and interface 153 can be implemented in the context of a "Windows" system. It can be appreciated, of course, that other types of systems are possible. For example, rather than a traditional "Windows" system, other operation systems, such as, for example, Linux may also be employed with respect to operating system 151 and interface 153. The software application 154 can include a multi-query privacy-preserving parking management module 152 for managing entries and exists with respect to a vehicle parking. Software application 154, on the other hand, can include instructions, such as the various operations described herein with respect to the various components and modules described herein, such as, for example, the method 300-600 depicted in FIGS. 4-9.

FIGS. 1-2 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Figure 3:
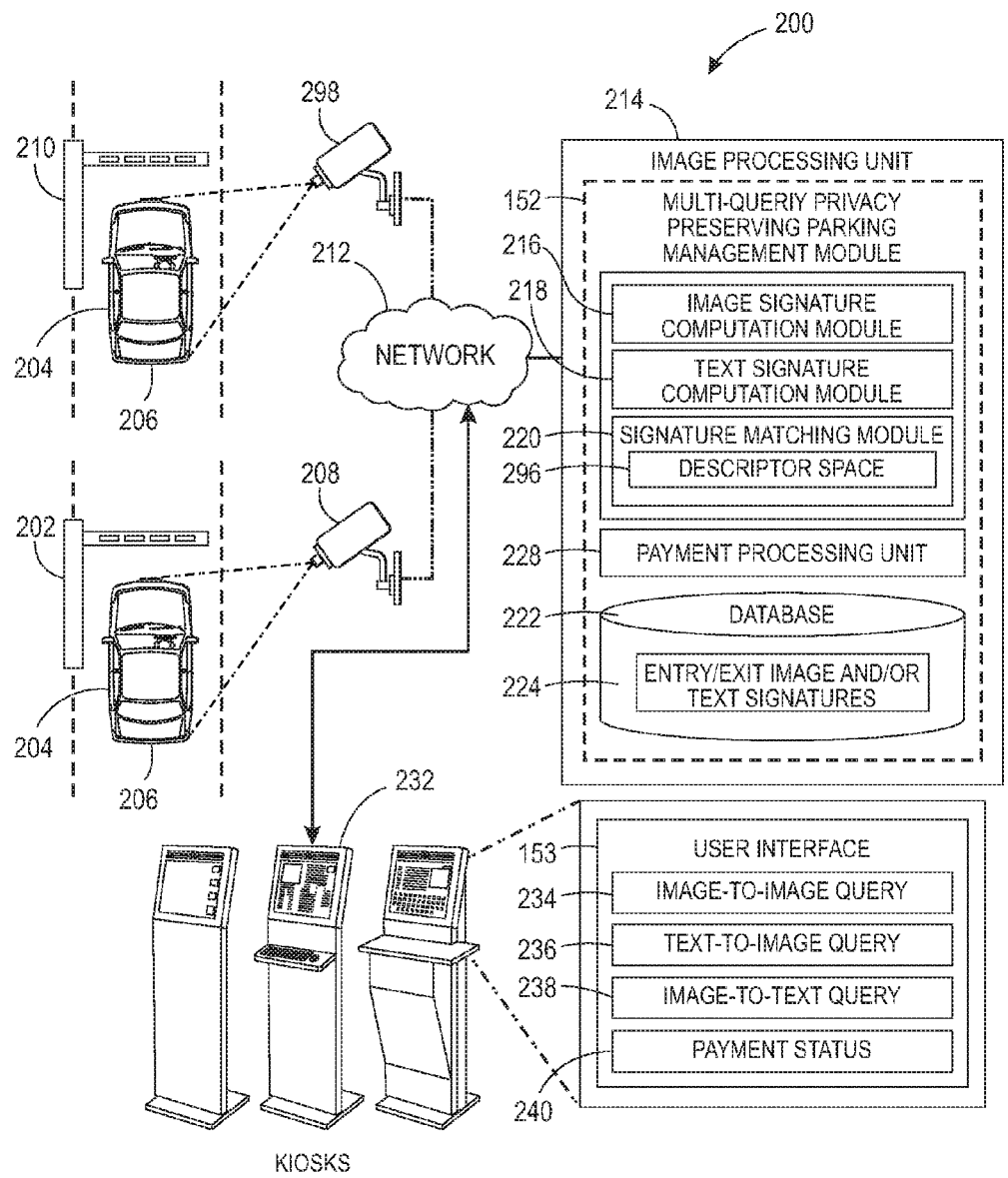
FIG. 3 illustrates a block diagram of a multi-query privacy-preserving parking management system, in accordance with a preferred embodiment.

FIG. 3 illustrates a block diagram of a multi-query privacy-preserving parking management system 200, in accordance with the disclosed embodiments. The multi-query privacy-preserving parking management system 200 manages entries and exits in a vehicle parking, where a vehicle 204 can be identified by an image signature 224. Note that in FIGS. 1-10, identical or similar blocks are generally indicated by identical reference numerals.

The multi-query privacy-preserving parking management system 200 generally includes an image capturing unit 208 (e.g., camera) at an entry point 202 with respect to a parking spot and an image capturing unit 298 at an exit point 210. The image-capturing unit 208 captures an image of the vehicle 204 with respect to a specific part (e.g., license plate 206) when the vehicle 204 enters via the entry point 202. The image capturing unit 298 captures the image of the vehicle 204 with respect to the specific part 206 when the vehicle 204 exits via the exit point 210.

The vehicle 204 can be, for example, a vehicle such as an automobile, truck, van, bus, motor home, tanker, motorcycle, or other vehicle(s) 204, etc., as well as trailers of all kinds in-tow. The image capturing unit 208 and 298 can be operatively connected to an image processing unit 214 via a network 212. Note that the image capturing units 208 and 298 described in greater detail herein are analogous or similar to the image capturing unit 108 of the data-processing system 100, depicted in FIG. 1. The image-capturing units 208 and 298 may include built-in integrated functions such as image processing, data formatting, and data compression functions. Also, the units 208 and 298 include imager-positioning, range-finding, and a flash bulb.

Note that the network 212 may employ any network topology, transmission medium, or network protocol. The network 212 may include connections such as wire, wireless communication links, or fiber optic cables. Network 212 can also be an Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages.

The multi-query privacy-preserving parking management system 200 further includes an image processing unit 214 that receives the captured image with respect to the vehicle 204 from the image capturing unit 208 and 298 in order to process the image. The image processing unit 214 is preferably implemented in the context of a computer server, but may be embodied in other devices and systems. The image processing unit 214 can be configured to include the multi-query privacy-preserving parking management module 152 and a kiosk 232 for payment processing with respect to the vehicle parking. The multi-query privacy-preserving parking management module 152 generally includes an image signature computation module 216, a text signature computation module 218, a signature matching module 220, and a payment processing unit 228.

The image signature computation module 216 computes the image signature 224 by embedding the image into a descriptor space 296 and the image signature 224 can be stored in the database 222 together with relevant metadata. Note that the metadata includes an entry time (for payment) and additional information such as the vehicle type, etc. Typically, a ticket can also be issued at entry time. The image signature 224 includes enough information to identify the vehicle 204 (or part of a vehicle) uniquely and is robust enough to accommodate variations in viewpoint or lighting conditions. The image signature computation module 216 extracts the corresponding part of the image such as, for example, the license plate 206 utilizing a detection algorithm.

The image signature computation module 216 computes the image signature 224 by extracting a set of local patches from the image and describing the patches with the descriptor 296. A statistic with respect to the patch descriptors 296 can be computed and aggregated using, for instance, the Fisher Vector framework. The image signature 224 (e.g., the FV) can be made more discriminative by applying a projection which is obtained for instance by learning a low-rank Mahalanobis metric. The visual signature 224 such as a Fisher vector (or its projection with a low-rank matrix) can be seen as a hash key of the original image.

The image signature computation module 216 can compute a signature by embedding the image into the descriptor space 296 and storing the signature in the database 222 together with relevant metadata. In one implementation, the text signature computation module 218 can be configured to synthesize, for example, a license plate image 206 for a corresponding license plate number. The image signature computation module 216 can compute an image signature. The embedding of the license plate number is consequently the image signature of the synthesized plate. In another implementation, the textual signature (e.g., a spatial pyramid of characters) can be computed and a mapping between the space of textual signatures and the space of image signatures can be learnt, which leads to a similarity of the form:

$$s(t,x)=(Wt)^T_x, \quad (1)$$

where the vector t represents the textual signature, the vector x represents the image signature (t and x might have different dimensionalities) and W represents the learned projection matrix. The linear mapping t→Wt embeds t in the space of image descriptors so that Wt and x can be compared via a simple dot-product operation. In summary, computing the license plate descriptor involves computing the text signature t, embedding t in the image descriptor by computing Wt.

The signature-matching module 220 can perform an entry-exit association by searching for a most similar image/text signature in the database 222. The signature-matching module 220 performs the matching between the image signatures and/or the matching between an image signature and a text signature by measuring the similarity and/or distance between vectorial representations. A dot product equivalent to a Euclidean distance can be employed for image-to-image matching using FV signatures since the FVs are L2 normalized. A dot product which is consistent with the similarity $s(t,x)=(Wt)^T_x$ can be used for image to text matching.

A user may or may not have to provide a ticket to exit the parking (depending on the scenario). A kiosk 232 enables standard operations such as payment directly by the user or through an operator on a user interface (e.g., user interface 153 shown in FIG. 2). The parking kiosk 232 can serve to regulate parking for a run of parking spaces. The parking kiosk 232 can be augmented with an image display capability and a plurality of functions such as, for example, touch screen, mouse, and/or selecting and entering buttons.

The kiosk 232 also enables query-by-license-plate number functionalities: the user or an operator can input a license plate number to retrieve relevant information (where relevant depends on the scenario—see later). The license plate number can be embedded into the same descriptor space 296 as the one used for license plate image(s) 206. The license plate number-license plate image association is performed by searching for the most similar signature in the database 222.

The system 200 thus can perform an image-to-image query 234, a text-to-image query 236, and an image-to-text query 238. The system 200 can search for a license plate number 206 even if the plate number is not recognized or stored in the database 222 and does not require an explicit recognition and storage of the license plate numbers 206 thus leading to privacy presentation.

Figure 4:
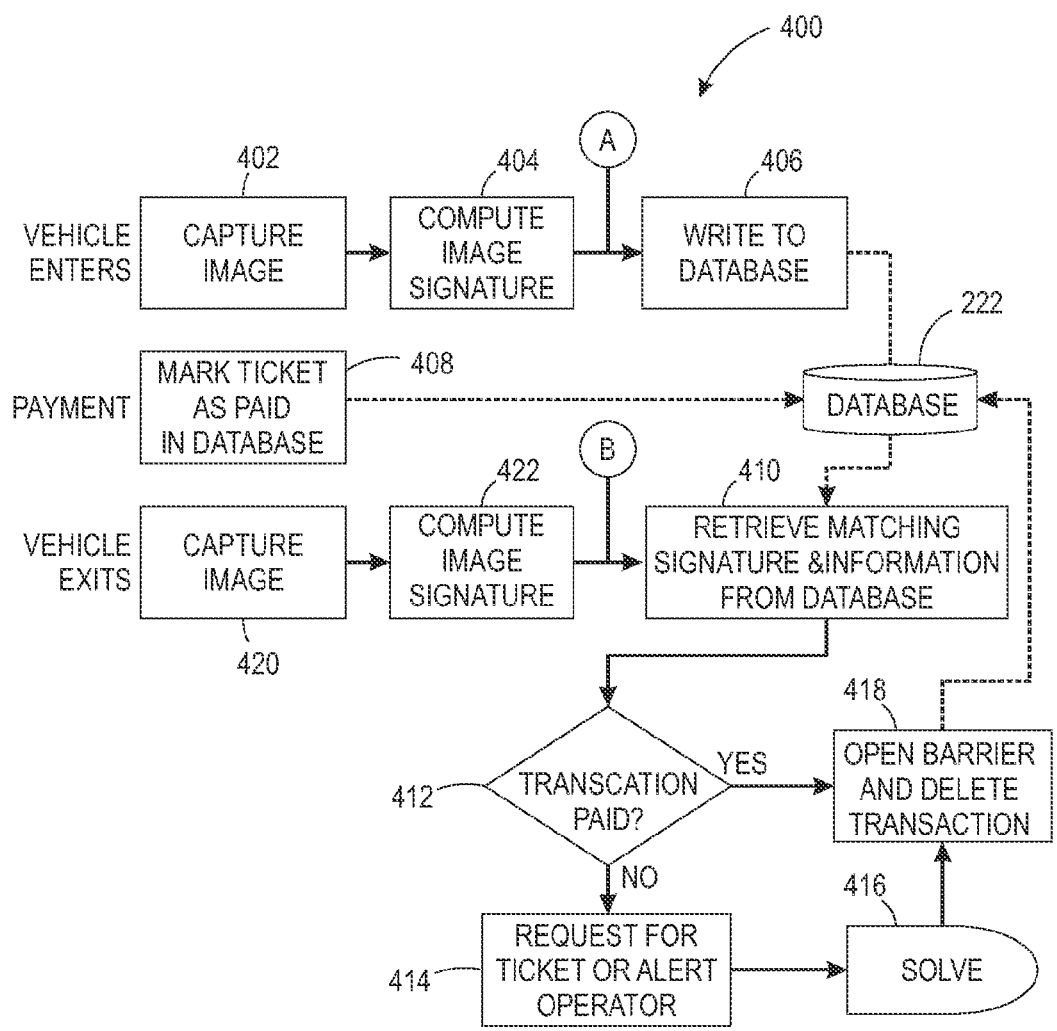
FIG. 4 illustrates a high level flow chart of operations illustrating logical operational steps of a method for matching image and/or text signatures, in accordance with the disclosed embodiments.

FIG. 4 illustrates a high level flow chart of operations illustrating logical operational steps of a method 400 for matching the image and/or text signatures 224, in accordance with the disclosed embodiments. Note that in FIGS. 4-8, rectangles generally represent algorithmic steps, the solid arrows indicate the sequence of the steps, and the dashed arrows indicate interactions with the database 222 (and the direction of interaction: write or retrieve).

Initially, when the vehicle 204 enters the parking lot, the vehicle 204 can be detected and the image can be captured, as shown at block 402. The image signature 224 can be computed and can be written to the database 222 together with additional information (e.g., ticket number, timestamp, etc.), as described at blocks 404 and 406. The ticket can be marked as paid, if the payment is processed at the kiosk 232, possibly with additional information (e.g., payment timestamp), as indicated at block 408 and the information can be stored in the database 222. The vehicle 204 can be captured at the exit point, as mentioned at block 420. The image signature 224 can be computed, as provided at block 422. The matching signature and the information can be retrieved from the database 222 together with additional information such as a payment status 240 for the associated ticket, as shown at block 410.

In some instances, a determination can be made if a transaction is paid, as depicted at block 412. If it is determined that in fact a transaction is paid, then the barrier can be opened and the transaction is deleted, as indicated at block 418. If the transaction is not paid, the ticket can be requested or an operator may be alerted, as depicted at block 414. The problem can be solved, as illustrated at block 416 and the barrier opened and the transaction deleted, as indicated at block 418.

Note that this is a "minimal" version of the workflow, which can be made more complex with other straightforward additions such as requesting payment at exit. Depending on the specific application, the kiosk(s) 232 may be public (i.e., anybody can issue queries) or private (i.e., only the operator can issue queries). Some services may be restricted to private kiosks (e.g., querying for the presence of the vehicle 204 in the parking lot) due to additional privacy issues.

Figure 5:
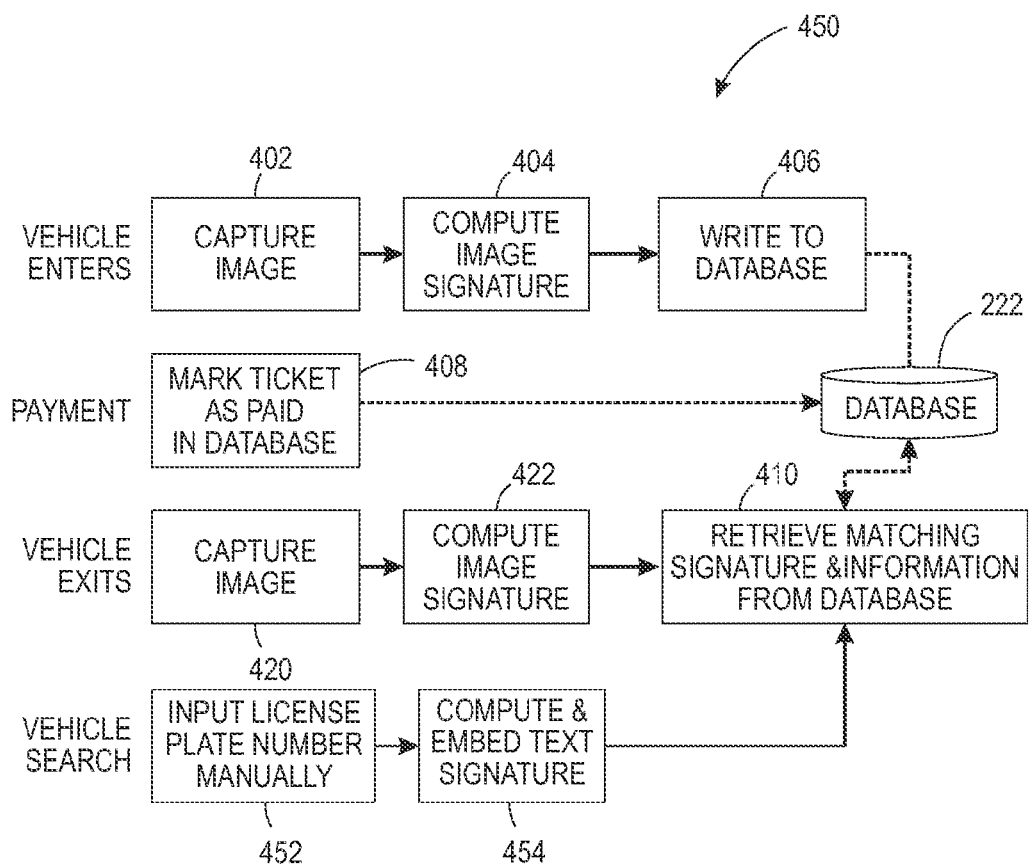
FIG. 5 illustrates a high level flow chart of operations illustrating logical operational steps of a method for matching an image signature, in accordance with a preferred embodiment.

FIG. 5 illustrates a high level flow chart of operations illustrating logical operational steps of a method 450 for matching text-to-image signatures (e.g., lost tickets, vehicle presence check), in accordance with an alternative embodiment. The method 450 shown in FIG. 5 can be employed for determining whether the vehicle 204 is still in the parking area (i.e, has entered but not exited) and also for security checks or to enable the operator re-issue a lost ticket.

Initially, when the vehicle 204 enters the parking lot, the vehicle 204 can be detected and the image can be captured, as shown at block 402. The image signature can be computed and can be written to the database 222 together with additional information (e.g., ticket number, timestamp, etc.), as described at blocks 404 and 406. The ticket can be marked as paid, if the payment is processed at the kiosk 232, possibly with additional information (e.g., payment timestamp), as indicated at block 408 and the information can be stored in the database 222. The vehicle can be captured at the exit point, as depicted at block 420. The image signature can be computed, as indicated at block 422. Thereafter, as shown at block 410, a step or operation can be implemented to retrieve the matching signature information from the database 222.

In some cases, the matching signature can be retrieved from the database 222 together with additional information such as the payment status 240 for the associated ticket, as indicated at block 410. The license plate number can be searched by inputting the license plate number manually, as described at block 452. The text signature can be computed and embedded, as indicated at block 454. The matching signature and the information can then be retrieved from the database 222, as shown at block 410.

Figure 6:
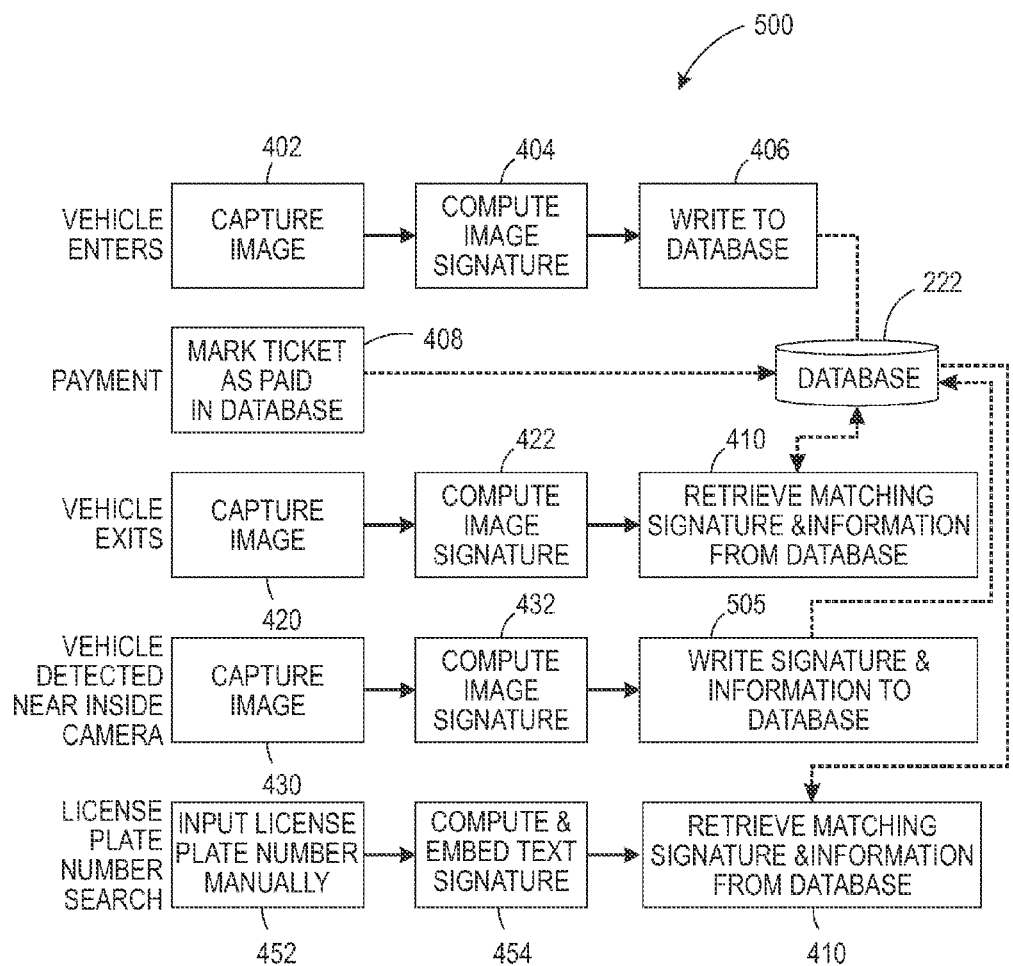
FIG. 6 illustrates a high level flow chart of operations illustrating logical operational steps of a method for searching for a vehicle, in accordance with an alternative embodiment.

FIG. 6 illustrates a high level flow chart of operations illustrating logical operational steps of a method 500 for searching for a vehicle 204, in accordance with an alternative embodiment. That is, FIG. 6 depicts the workflow for a "where is my car" search that extends the previously described search scenarios by adding information obtained from "inside" cameras (e.g., cameras located within a parking lot). As shown at block 430, the vehicle image can be captured if the vehicle 204 is detected near an inside image capturing unit 208 such as a location ID of the image capturing unit 208 (e.g., the first floor of a parking structure). The image signature 224 can be computed, as described at block 432. The signature 224 and the information can be written to the database 222, as illustrated at block 505. The license plate number can be searched by inputting the license plate number manually, as described at block 452. The text signature can be computed and embedded, as shown at block 454. The matching signature and the information can then be retrieved from the database 222, as shown at block 410.

In the scenario illustrated in FIG. 6, when a vehicle is detected near an inside camera, the system 200, for example, can compute an image of the vehicle's license plate and also compute its signature and write this signature to the database 222 with information such as the location ID of the camera. Then, a manual query can proceed as in the case of a license plate search, but in this scenario, the returned information for a license plate number includes the location ID. It is important to clarify that the parking lot may contain inside cameras (other than entry/exit) and that image signature computation and storage of the location ID may occur whenever the vehicle passes in front of the cameras. A crucial aspect of the "retrieved" information is the location ID (because it indicates where the car is located).

Figure 7:
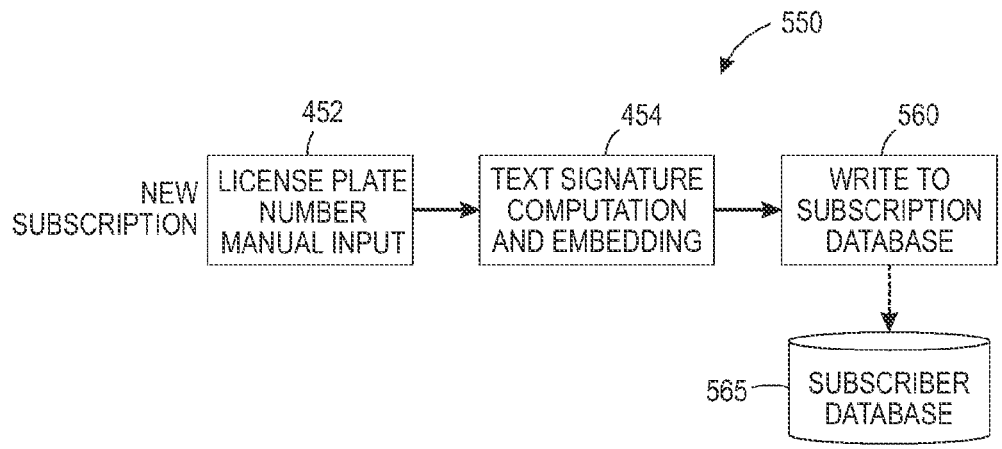
FIG. 7 illustrates a high level flow chart of operations illustrating logical operational steps of a method of subscriber and blacklist management, in accordance with an alternative embodiment.

FIG. 7 illustrates a high level flow chart of operations illustrating logical operational steps of a method 550 subscriber and blacklist management, in accordance with an alternative embodiment. Note that the configurations shown in both FIGS. 7-8 involve the user of a subscriber database 565. The subscriber scenario shown in FIG. 7 enables adding of license plate numbers of subscribers to allow for free entry/exit. Note that the adding of a subscription to, for example, the subscriber database 565 preferably occurs offline. In such a situation, the license plate number can be manually typed as depicted at block 452. The signature can be computed and embedded, as described at block 454, and then added to the database 565 of subscriber signatures as shown at block 560. Then, for each vehicle at entry, the image signature can be compared to each signature in the subscriber database 565.

Figure 8:
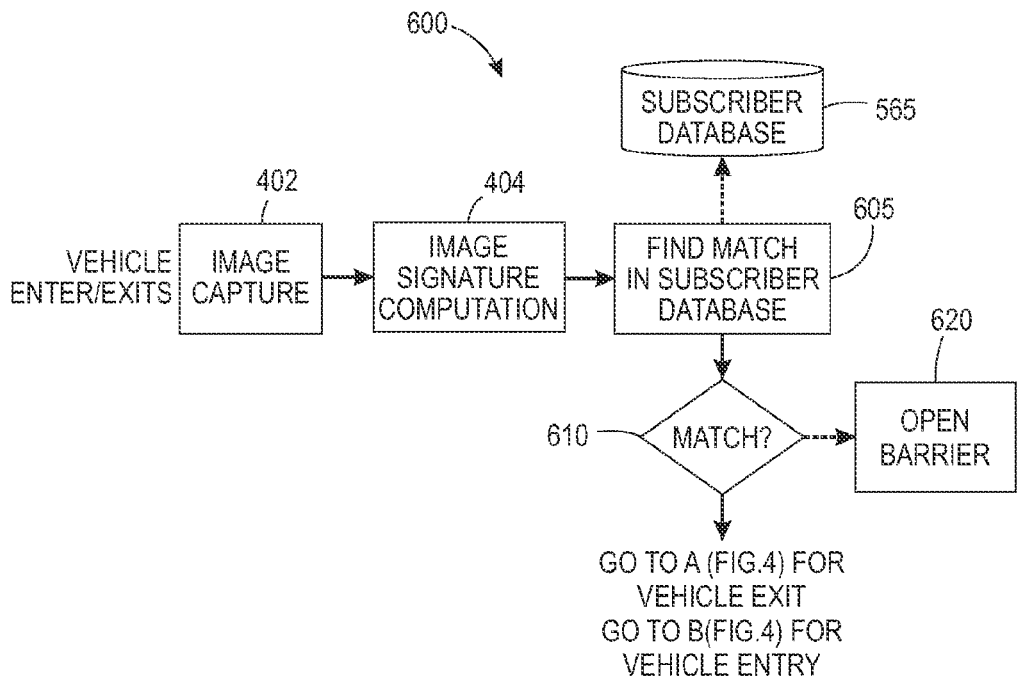
FIG. 8 illustrates a high-level flow chart of operations of a method of partial workflow for "subscriber management," in accordance with an alternative embodiment.

FIG. 8 illustrates a high-level flow chart of operations of a method 600 of partial workflow for "subscriber management," in accordance with an alternative embodiment. In the example scenario shown in FIG. 8, when a vehicle (e.g., vehicle 204) enters the parking lot, the image of the vehicle (e.g., image of license plate on vehicle) can be captured, as shown at block 402. Then, as depicted at block 404, the image signature 224 can be computed. Then, as shown at block 605, an operation can be implemented to find a match in the subscriber database 565. Such a determination can be made whether the image signature matches with the signature in the subscriber database 565, as illustrated at the decision block 610 shown in FIG. 8. If the signature matches, the barrier can be opened, as indicated at block 620. Otherwise, the process shown in FIG. 5 can be repeated with respect to the vehicle entry point 202 and the vehicle exit point 210.

Figure 9:
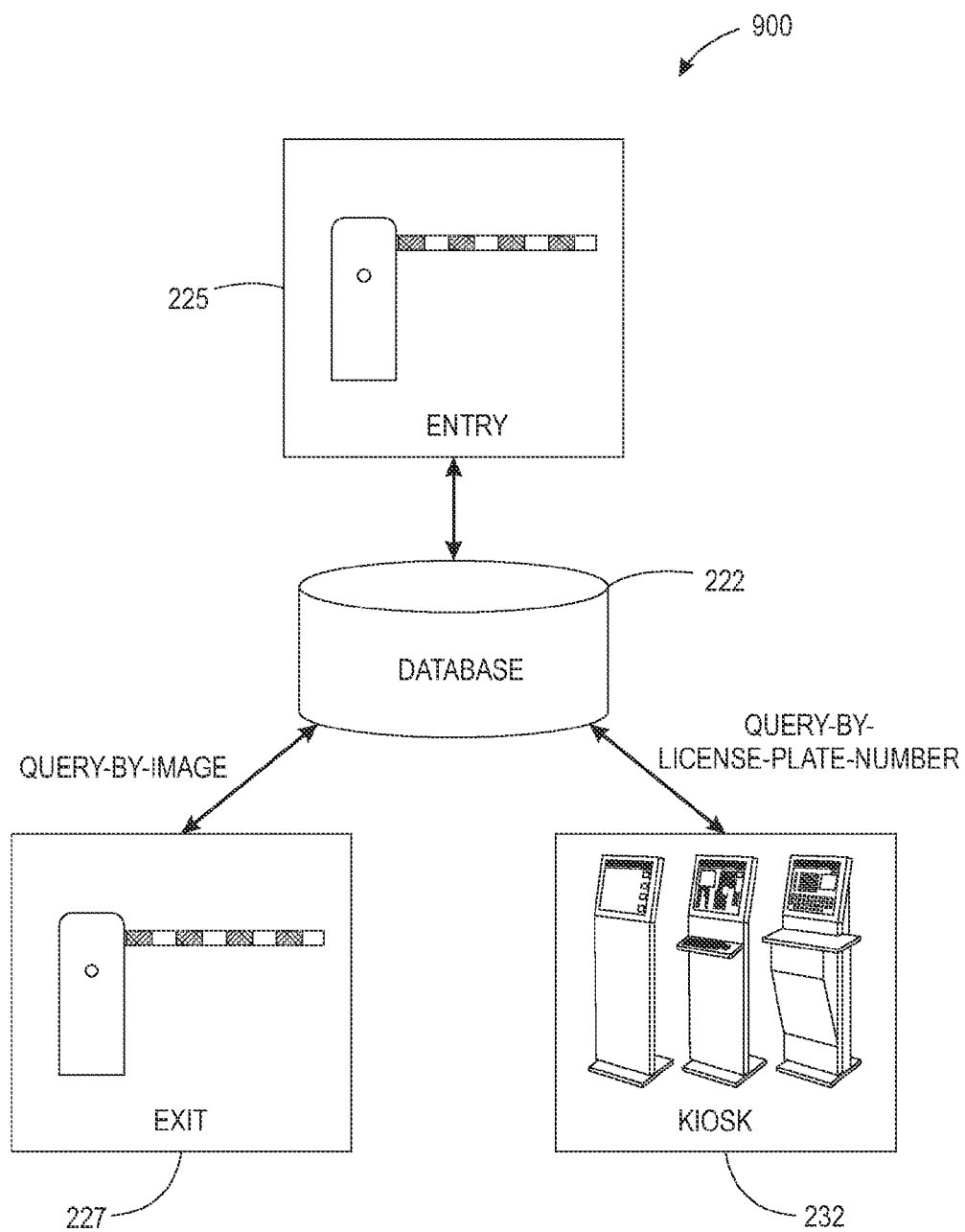
FIG. 9 illustrates a block diagram of a system with the ability to embed both license plate images and license plate numbers in the same space, in accordance with a preferred embodiment.

FIG. 9 illustrates a block diagram of a system 900 with the ability to embed both license plate images and license plate numbers in the same space, in accordance with a preferred embodiment. System 900 shown in FIG. 9 is analogous to system 200 shown FIG. 3. Minimal system components are shown, however, in the FIG. 9 system diagram. System 900 is depicted as a de minimus system configuration to illustrate the basic but essential elements of an embodiment.

System 900 functions as a multi-query privacy-preserving parking management system. One of the key concepts behind such a system is that since we already have the means to extract image signatures and compute similarities between them, it would be convenient to extract text signatures that lie in the same space as the image signatures. Then, we can indistinctively match images with text or other images using the same infrastructure existing for image matching.

System 900 includes at least one entry point 225, a database 222 (similar to database 222 of FIG. 3), at least one exit point 227, and at least one kiosk 232. Regarding the entry point(s) 225, when a vehicle enters the parking lot, at least one image of the vehicle is captured. The image of the vehicle may focus on a specific part, typically the license plate area (front or rear or both). An image signature is computed: this involves embedding the image into a descriptor space. The signature is stored in the database 222 together with relevant metadata. Such metadata may include at least the entry time (for payment), but this may include additional information such as the vehicle type. Typically, a ticket is also issued at entry time.

Regarding the exit point(s) 227, when a vehicle proceeds to the exit of the parking lot, at least one image of the vehicle is captured similarly to what happened at entry time. The entry-exit association is done by searching for the most similar signature in the database. The user may or may not have to provide a ticket to exit the parking (depends on the situation).

Regarding the kiosk(s) 232, the kiosk enables standard operations such as payment directly by the user or through an operator. Kiosk 232 also enables query-by-license-plate-number functionalities: the user or an operator can input a license plate number to retrieve relevant information (wherein relevant depends on the scenario—see later). The license plate number is embedded into the same descriptor space as the one used for license plate images. The license plate number/license plate image association can be accomplished by searching for the most similar signature in the database. The database 222 stores information collected at entry time and enables query-by-image and query-by-license plate number functionalities.

Based on the foregoing, it can be appreciated that a number of embodiments, preferred and alternative, are disclosed herein. For example, in one embodiment, a privacy-preserving multi-query parking management system can be implemented. Such a system can include one or more points wherein at least one license plate image signature is captured, computed and stored in a database of image signatures, and one or more exit points wherein at least one license plate image signature is captured, computed and matched to the database, and one or more kiosks that enable a query-by-license plate number with respect to the image signatures stored in the database based on a license plate number and license plate image association.

The license plate signature(s) can be queried based on, for example, an image-to-image query, a text-to-image query, and an image-to-text query. Each license plate image signature can be computed and stored in the database as a Fisher vector image signature. Alternatively, each license plate image signature can be computed and stored in the database as a spatial pyramid of characters text signature. In some embodiments, the database can be queried to determine a lost ticket. In another embodiment, the database can be queried to determine the presence of a vehicle with respect to a parking location. In some embodiments, the database can be implemented as a subscriber database to which subscribers are added to allow free entry and/or free exist respectively through the one entry point and/or the exit point.

In still another embodiment, a multi-query privacy-preserving parking management system can be implemented, which includes a database that stores information collected at entry and enables query-by-image and query-by-license plate number functionalities. Such a system can further include at least one entry point wherein when a vehicle enters, at least one image of the vehicle is captured and at least one image signature associated with the vehicle computed by embedding the image into a descriptor space and stored in the database; at least one exit point wherein when the vehicle proceeds to exit through the at least one exit point, at least one image of the vehicle is captured and an entry-exit association performed with respect to the vehicle by searching for a signature most similar to the at least one image signature in the database; and at least one kiosk that enables the query-by-license-plate number functionalities with respect to the at least one image signature database and wherein the at least one kiosk further enables payment operations. In some embodiments, the at least one image signature can be stored in the database with relevant metadata.

In another embodiment, a computer-implemented multi-query parking management method can be implemented. Such a method can include the steps or logical operations of computing a first image signature with respect to an image of a vehicle part captured at an entry point by embedding the image into a descriptor space and storing the first image signature in a database together with relevant metadata; calculating a second image signature with respect to an image of the vehicle part captured at an exit point and storing the second image signature in the database; performing an entry-exit association by searching and retrieving a most similar image signature with respect to the second image signature from the database; and querying the database via a kiosk that communicates with the database to obtain information about a vehicle associated with the vehicle part.

In another embodiment, steps or logical operations can be provided for computing a text signature from a textual query rendered at the kiosk and utilizing the text signature to assist in confirming the vehicle. In yet another embodiment, the image of the vehicle part can constitute an image of a vehicle license plate or an image of some other identifying portion or part of the vehicle. In still another embodiment, a step or logical operation can be implemented for computing the text signature further comprises synthesizing the license plate image for a corresponding license plate number wherein embedding of the license plate number comprises an image signature of the synthesized plate.

In another embodiment, a step or logical operation can be provided for computing the text signature further comprises computing a spatial pyramid of characters and developing a mapping between a space of the text signature and a space of an image signature utilizing a projection matrix. In still another embodiment, a step or logical operation can be implemented for performing a matching between the image signatures and/or matching between the image signatures and the text signature by measuring a similarity and/or distance between two vectorial representations.

In yet another embodiment, the step or logical operation of computing the first image signature or the second image signature can further include steps or logical operations for extracting a set of local patches from the vehicle part image and describing the patches with the descriptor; computing and aggregating a set of statistics with respect to each patch descriptor using a Fisher Vector framework applying a projection obtained by learning a low-rank Mahalanobis metric in order to render the first image signature or the second image signature more discriminative; and matching the first image signature or the second image signature with image signatures stored in the database.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

The invention claimed is:

1. A privacy-preserving multi-query parking management system, comprising:
   at least one image capturing unit among a plurality of image capturing units;

at least one entry point wherein at least one license plate image signature is captured with said at least one image capturing unit, computed, and stored in a database of image signatures, said image signatures including said at least one license plate image signature, said at least one image capturing unit having built-in integrated functions including image processing, data formatting, data compression, imager-positioning, range-finding, and a flash bulb, wherein said at least one image capturing unit is associated with said at least one entry point;

at least one exit point wherein at least one license plate image signature is captured via at least one other image capturing unit among said plurality of image capturing units, computed, and matched to said database, wherein said at least one license plate image signature is computed by embedding an image associated with said at least one license plate image signature into a descriptor space, and wherein said at least one license plate image signature is stored in said database together with meta-data relevant to said at least one license plate image signature, wherein said at least one other image capturing unit is associated with said at least one exit point;

at least one electronic kiosk having a touch screen display that enables a query-by-license plate number with respect to said image signatures stored in said database based on a license plate number and license plate image association, said electronic kiosk including payment processing with respect to a vehicle parking;

wherein said descriptor space includes at least one patch descriptor, and wherein said at least one license plate image signature is computed and stored in said database as at least one Fisher Vector image signature;

wherein a statistic with respect to said at least one patch descriptor is computed and aggregated utilizing a Fisher Vector Network; and wherein said at least one license plate image signature is rendered more descriptive by applying a projection obtained utilizing a low-rank Mahalanobis metric.

2. The system of claim 1 wherein said at least one license plate signature is queried based on an image-to-image query.

3. The system of claim 1 wherein said a least one license plate signature is queried based on a text-to-image query.

4. The system of claim 1 wherein said license plate signature is queried based on an image-to-text query.

5. The system of claim 1 wherein said kiosk comprises an electronic parking kiosk.

6. The system of claim 1 wherein said at least one license plate image signature is computed and stored in said database as at least one spatial pyramid of characters text signature.

7. The system of claim 1 wherein said database is queried to determine a lost ticket.

8. The system of claim 1 wherein said database is queried to determine a presence of a vehicle with respect to a parking location associated with said at least one image capturing unit or said at least one other capturing unit among said plurality of image capturing units.

9. The system of claim 8 wherein said database further comprises a subscriber database to which subscribers are added to allow free entry and/or free exist respectively through said at least one entry point and/or said at least one exit point and wherein said system performs an image-to-image query, a text-to-image query, and an image-to-text query.

10. A mufti-query privacy-preserving parking management system, comprising:

at least one image capturing unit among a plurality of image capturing units, said at least one image capturing unit having built-in integrated functions including image processing, data formatting, data compression, imager-positioning, range-finding, and a flash bulb;

a database that stores information collected at entry and enables query-by-image and query-by-license plate number functionalities;

at least one entry point wherein when a vehicle enters, at least one image of said vehicle is captured and at least one image signature associated with at least one image of said vehicle computed by embedding said image into a descriptor space and stored in said database, said descriptor space including at least one patch descriptor and wherein said at least one license plate image signature is computed and stored in said database as at least one Fisher Vector image signature, said descriptor space comprising a same descriptor space as a descriptor space used for an image associated with said at least one image signature;

at least one exit point wherein when said vehicle proceeds to exit through said at least one exit point, at least one image of said vehicle is captured and an entry-exit association performed with respect to said vehicle by searching for a signature most similar to said at least one image signature in said database; and at least one kiosk that enables said query-by-license-plate number functionalities with respect to said at least one image signature database and wherein said at least one kiosk further enables payment operations including marking a parking ticket as paid and including a payment timestamp, wherein said payment timestamp is stored in said database.

11. The system of claim 10 wherein said at least one image signature is stored in said database with relevant metadata wherein said relevant data includes an entry time associated with said vehicle entering said at least on entry point and a vehicle type of said vehicle.

12. The system of claim 11 wherein said system performs an image-to-image query, a text-to-image query, and an image-to-text query.

13. The system of claim 12 wherein said at least one image signature is computed and stored in, said database as at least one spatial pyramid of characters text signature.

14. A multi-query parking management method, said method comprising:

computing a first image signature with respect to an image of a vehicle part captured by said at least one image capturing unit among a plurality of image capturing units at an entry point by embedding said image into a descriptor space and storing said first image signature in a database together with relevant metadata, said at least one image capturing unit having built-in integrated functions including image processing, data formatting, data compression, imager-positioning, range-finding, and a flash bulb;

calculating a second image signature with respect to an image of said vehicle part captured at an exit point by at least one image capturing unit having built-in integrated functions including image processing, data formatting, data compression, imager-positioning, range-finding, and a flash bulb and storing said second image signature in said database;

performing an entry-exit association by searching and retrieving a most similar image signature with respect to said second image signature from said database;

computing a text signature from a textual query rendered at said electronic kiosk and facilitated through a touch screen display associated with said electronic kiosk;

utilizing said text signature to assist in confirming said vehicle; and querying said database via an electronic kiosk that communicates with said database to obtain information about a vehicle associated with said vehicle part, and wherein computing said text signature further comprises synthesizing said license plate image for a corresponding license plate number wherein embedding of said license plate number comprises an image signature of said synthesized plate and wherein said image of said vehicle part comprises a license plate image.

15. The method of claim 14 wherein computing said text signature further comprises computing a spatial pyramid of characters and developing a mapping between a space of said text signature and a space of an image signature utilizing a projection matrix.

16. The method of claim 15 further comprising performing a matching between said image signatures and a matching between said image signatures and said text signature by measuring a similarity and a distance between two vectorial representations.

17. The method of claim 16 wherein computing said first image signature or said second image signature, further comprises:

extracting a set of local patches from said vehicle part image and describing said patches with said descriptor;

computing and aggregating a set of statistics with respect to each patch descriptor using a Fisher Vector framework;

applying a projection obtained by learning a low-rank Mahalanobis metric in order to render said first image signature or said second image signature more discriminative; and matching said first image signature or said second image signature with image signatures stored in said database.

* * * * *